United States Patent [19]
Blecher

[11] 3,764,206
[45] Oct. 9, 1973

[54] MAGAZINE
[76] Inventor: Stephen Blecher, Littleton, Colo.
[73] Assignee: Honeywell Inc., Minneapolis, Minn.
[22] Filed: Jan. 5, 1971
[21] Appl. No.: 103,997

[52] U.S. Cl. ............................... 353/21, 353/114
[51] Int. Cl. ........................................... G03b 23/14
[58] Field of Search .................... 353/103, 114, 116, 353/118, 21

[56] References Cited
UNITED STATES PATENTS
| | | | |
|---|---|---|---|
| 3,602,587 | 8/1971 | Blecher et al. | 353/21 |
| 3,171,222 | 3/1965 | Sakaki et al. | 353/118 |
| 3,258,867 | 7/1966 | Hall | 353/116 |

FOREIGN PATENTS OR APPLICATIONS
| | | | |
|---|---|---|---|
| 1,435,924 | 3/1966 | France | 353/116 |

Primary Examiner—Harry N. Haroian
Attorney—Arthur H. Swanson and Lockwood D. Burton

[57] ABSTRACT

A stack type magazine for a slide projector having a casing containing two spaced apart partitions that divide the casing into three sections, namely, a slide supply section into which a stack of slides can be placed that are to be moved to a preview position, a second dummy section into which each successive slide that has been previewed can be moved before it is returned to a projecting position in the projector and a slide take-up section into which each successive slide can be moved after it has been projected.

2 Claims, 12 Drawing Figures

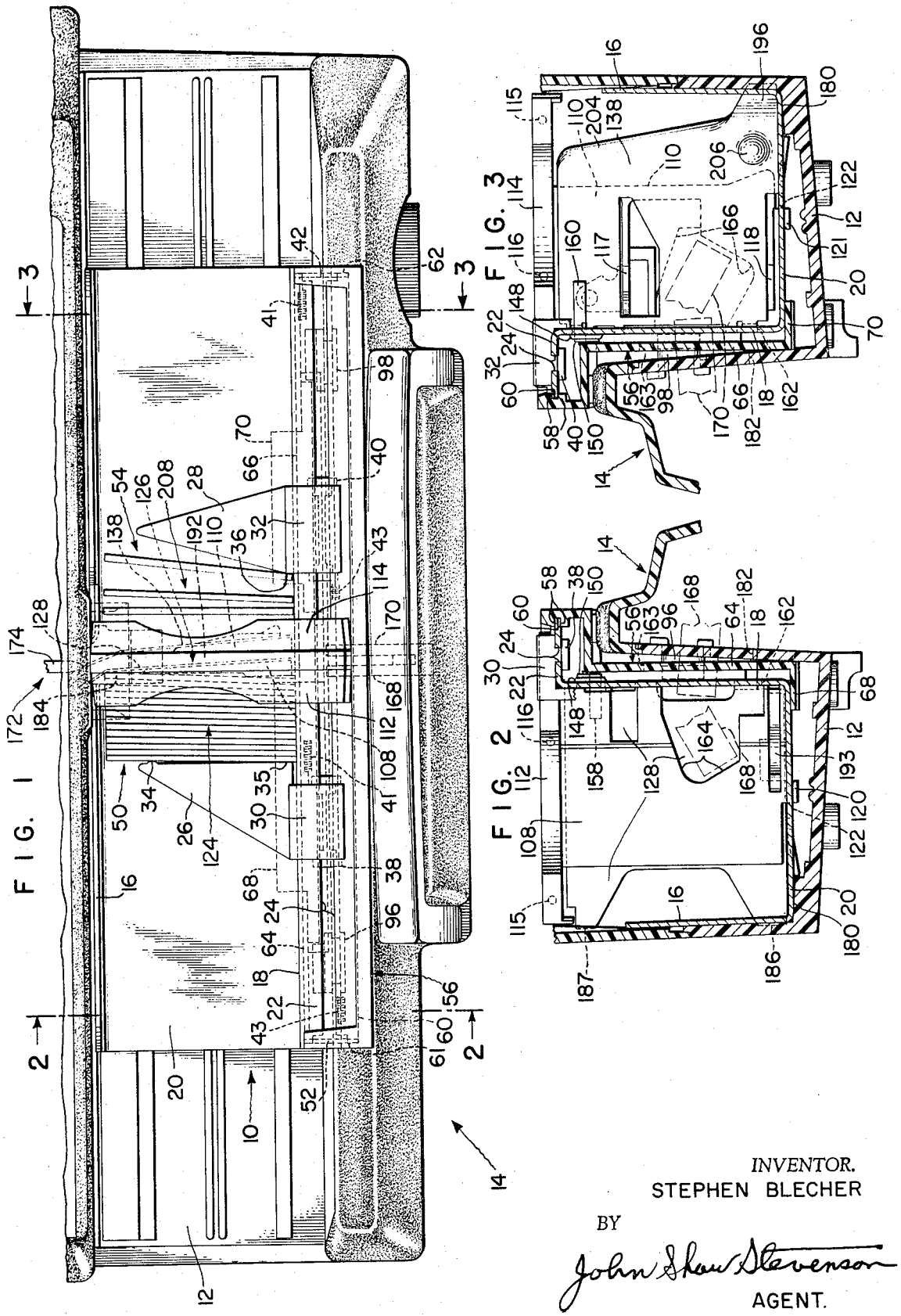

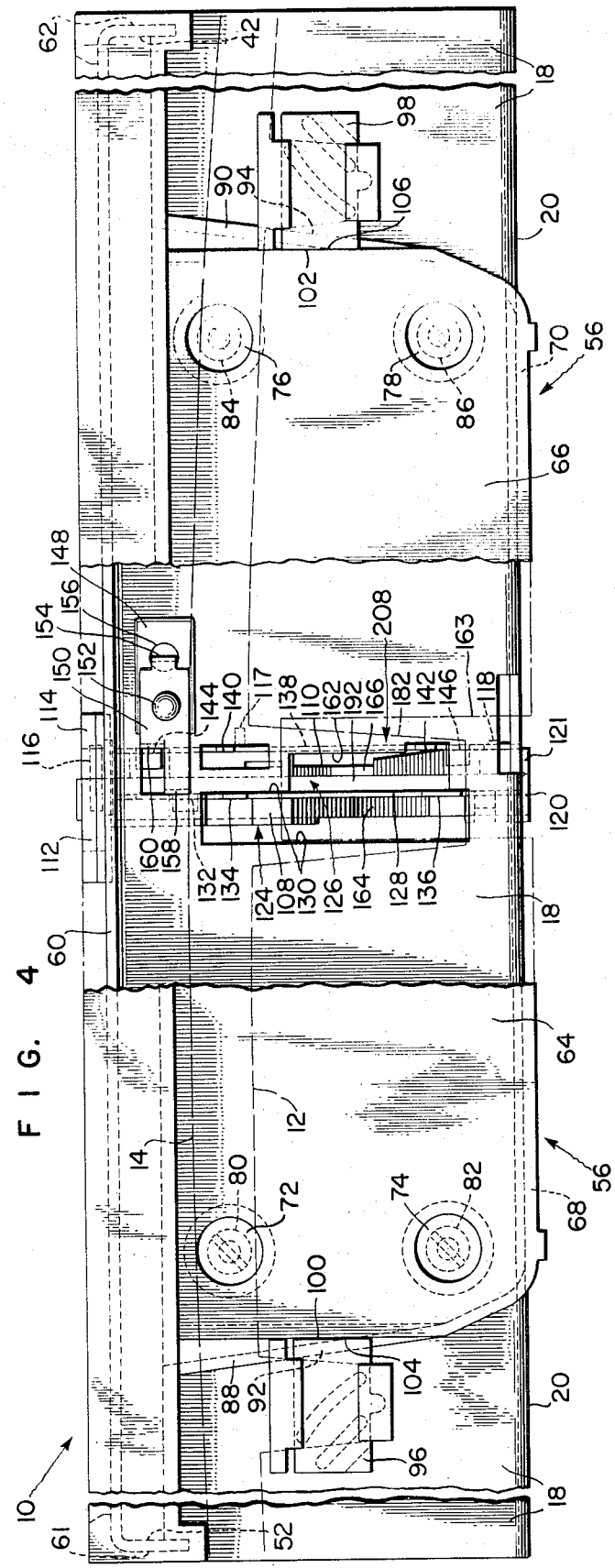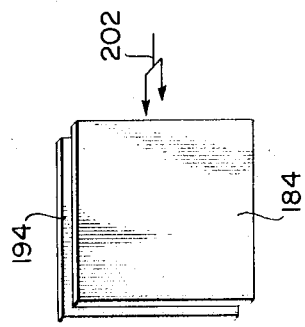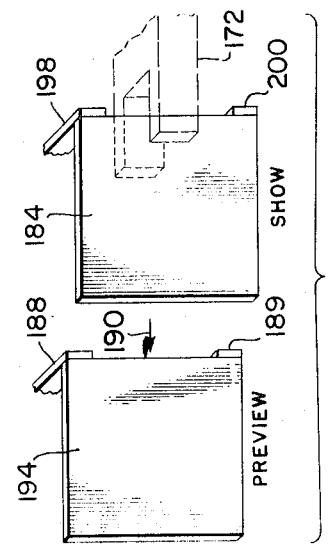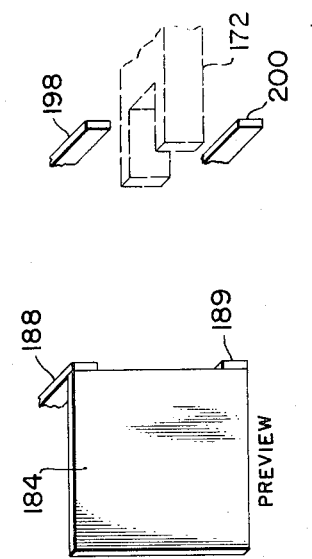

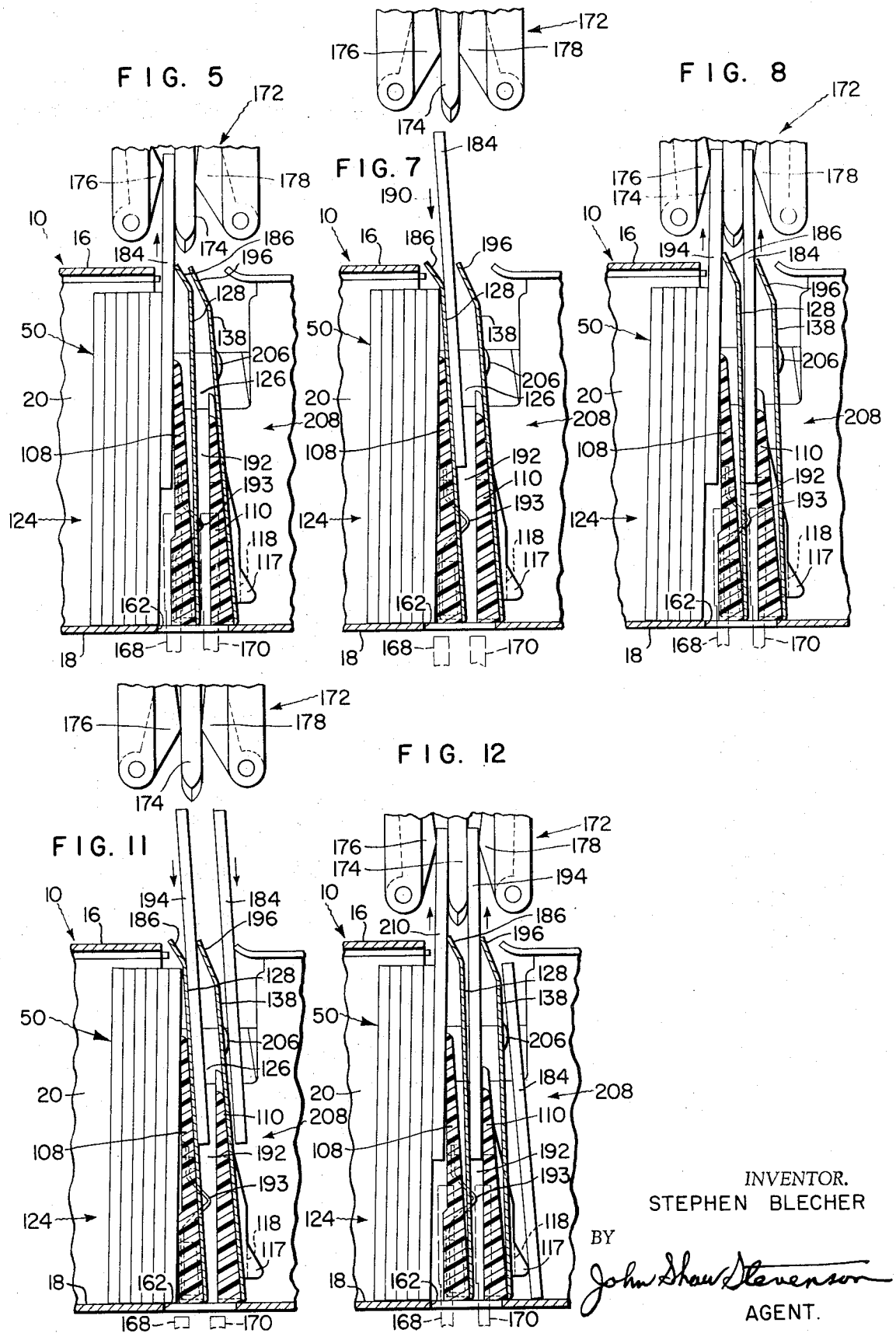

MAGAZINE

It is an object of the present invention to provide a three section stacked type magazine for insertion in a slide projector that has a unique intermediate dummy section between a supply and take-up section to receive slides after they have been previewed in the projector and from which they can readily be moved by a slide changing mechanism into a projecting position in the projector and thence into the take-up section.

More specifically it is another object of the present invention to provide a casing in the form of a U-shaped stack loader for insertion in the trough of a projector which loader has two spaced apart partitions for separating it into the aforementioned supply, dummy and take-up sections.

It is another object of the present invention to provide a resilient plate associated with each of the aforementioned sections to guide slides out of the aforementioned supply and dummy sections of the stack loader.

It is another object of the present invention to provide a first one of the aforementioned resilient plates with bent portions that will not only guide a slide as it is moved from the supply section into the gripping arms of a slide changing mechanism for movement to a preview position but which also guides the slide being returned from the preview position by the slide changing mechanism into the dummy section of the magazine.

It is another object of the present invention to provide a second one of the aforementioned resilient plates with bent portions that will not only guide a slide from the dummy section into the gripping arms of a slide changing mechanism for movement to a projecting or show position but which also guides the slide being returned from the projecting, show, position by the slide changing mechanism into the take-up section of the magazine.

It is another object of the present invention to provide a slot in the partition of the aforementioned magazine that form a wall between its supply and dummy section and to provide an opening in the side wall of the magazine through which an arm of a pair of slide pushing arms that extends part way into the supply section can travel to move the top slide in the stack of the slides in the supply sector into the left gripping jaw of a slide changing mechanism for movement into a preview position in the projector while the other arm is being passed through the dummy slot and adjacent inner sidewall portion of the second partition to effect movement of a slide in the dummy section into the right gripping jaw of the slide changing means for movement into a projecting position in the projector.

These and other objects and advantages of the invention will become more readily apparent when the following description is read in conjunction with the attached drawings in which:

FIG. 1 is a plan view of the stack type magazine;

FIG. 2 is an elevation view through section 2—2 of FIG. 1 with the pressure plates removed to show the slotted wall in the first partition, the slide pushing arm passing therethrough and how the stack loader is supported against longitudinal movement on tray support buttons of the projector;

FIG. 3 is an elevation view of the section 3—3 of FIG. 1 with the pressure plates removed to show the relationship of one of the two aforementioned resilient plates with the casing and second partition;

FIG. 4 is an elevation view of the stack loader support member in contact with the magazine support members mounted in the side wall of the trough of the projector;

FIG. 5 shows the position of the first slide in a stack of slides in the supply section of the magazine after its forward end is moved by the pusher arm past the first resilient plate into the left gripping side of the slide changing mechanism and before it is moved into a preview position.

FIG. 6 shows the position of the slide and gripper after they have been moved to a preview position in the projector;

FIG. 7 shows the position that the slide will be in as it is returned from the preview position past the right side surface of the first resilient plate into the dummy slot;

FIG. 8 shows the next position that the first and second slides will be in after their forward ends are moved jointly by the pusher arm past the first and second resilient plates into the respective right and left gripping jaws of the slide changing member and before they are moved to their respective preview and projecting (show) position;

FIG. 9 shows the position of the previously mentioned slides and gripper of the slide changing member in their respective preview and projecting positions and an arrow to indicate the direction the slides are moved during their return to the stack loader;

FIG. 10 shows the position that the first and second slides will be in as their forward ends are jointly being kicked by a kicker plate, not shown, on their return stroke to the dummy and take-up sections of the magazine;

FIG. 11 shows the manner in which the slides are returned to the associated take-up and dummy sections of the stack loader type magazine;and FIG. 12 shows the first slide positioned in the take-up section and the next position that the second and third slide will be in after their forward ends are moved jointly by the pusher arm past the first and second resilient plates into the respective right and left gripping sides of the slide changing member and before they are moved to their respective preview and projecting positions.

Referring now to FIGS. 1–3 there is shown a unique stacked type magazine 10 mounted in a trough 12 of a slide projector 14. A typical projector shown by way of illustration in these FIGS. 1–3 into which the magazine 10 can be mounted is provided with means for previewing a slide before it is moved into a projecting or show position.

A more detailed description of this preview type slide projector and the slide changing mechanism associated therewith can be had by referring to the Stephen Blecher et al U.S. Pat. application, Ser. No. 759,608 now U.S. Pat. No. 3,602,587 issued Aug. 31, 1971.

The stacked type magazine or tray 10 is of a unitary U-shaped configuration and is comprised of two side portions 16, 18 and a base portion 20 extending therebetween. A portion 22 that is integral with the U-shaped portion extends as is best shown in FIGS. 2 and 3 in a horizontal plane outwardly from a top and side portion 18.

A slotted out wall portion 24 is formed in the horizontal portion 22 that extends from one end of the plate portion 22 to the other. Two pressure plates 26, 28 having associated finger gripping portions 30, 32, and associated slide engaging portions 34, 35, 36 each shown having an inverted tee shaped base portion 38, 40 extending through the slotted wall 24 for sliding movement therealong.

Although not shown in detail, it should be understood that a suitable coil spring 41 is employed that extends from a connection at the left end of the tee shaped base portion 38 shown in FIGS. 1 and 2, below the horizontal plate 22 into engagement with a vertical bent down right end portion 42 of the plate 22 in order to force the pressure plate 26 against the stack of the slides 50.

In a similar manner another suitable coil spring 43 is employed that extends from the connection at the right end of the tee shaped base portion 40 shown in FIGS. 1—3 below the horizontal plate 22 into engagement with a vertical bent down left end portion 52 of the plate 22 in order to force the pressure plate 20 against the stack that slides 54.

A unitary support member 56 that is preferably made of a suitable tough plastic material is shown having an upper portion which extends beyond the ends of the horizontal plate 22 and is slidably fitted in assembled relation therewith by means of a thin elongated slotted out apertured wall portion 58 that is slid over the entire elongated edge portion 60 of the horizontal plate 22.

Suitable vertically channelled out apertured wall portions 61, 62 are also formed at the opposite end of the support member 56 for slidably fitting in assembled relationship over associated right and left end bent down vertical portions 42,52 of horizontal plate 22.

The unitary support member 56 has side portions 64, 66 that are adjacent the side portion 18 of the tray 10 and lower portion 68, 70 that extends under and in snug relationship with the base plate 20 of the tray 10.

Cylindrically shaped embossed spacers 72, 74, 76, 78 are formed on the inner surface of the side portion 64, 66 of the support member 56 which extend to the outer surface of the side portion 18 of the tray 10. A suitable number of connections such as screws 80, 82, 84, 86 are employed as shown in FIG. 4 which extend through the vertical side plates 18 of the magazine and are threadedly engaged with the embossed spacers 72 — 78 to retain the side portions 64, 66 of support member 56 in a fixed position on the U-shaped tray 10 after member 56 has been moved into its slidably assembled position with the magazine 10.

The right and left ends of the support member 56 have triangular shaped recess portions 88, 90 for vertical sliding engagement with the front faces 92, 94 of associated protuberances 96, 98 that are attached to and which protrude inwardly away from the inner wall in an outside surface of the trough 12 of the projector 14. The protuburances may for example be mounted on the side wall of trough 12 in a manner similar to that set forth in the Stephen Blecher U.S. Pat. application Ser. No. 24,582.

Each of the edges 100, 102 of support member 56 that protrudes upwardly from their associated recessed portion are brought into engagement with the vertical inner end surfaces 104, 106 of the protuberances 96, 98 as shown in FIG. 4.

When the support 56 of tray 10 is engaged with the protuberances 96, 98 in the manner shown in FIG. 4 it will be retained in a fixed position and no longitudinal movement of the tray can occur.

The stacked type magazine 10 has a pair of stationary spaced apart partitions 108, 110 preferably made of a tough plastic material which is in each case fixedly connected at the i.e., respective upper portions 112; 114 by any suitable means such as dowel connections 115, 116, as shown in FIG. 2. The partition 110 also has slide guides 117, 118 that protrude therefrom.

The bottom of these partitions 108, 110 each have protuberances for example 120, 121 that pass through apertures forming a wall portion 122 in the bottom of the magazine 10 and which are firmly connected therewith.

The magazine tray 10 is thus divided into three sections. A first one of these sections 124 is located to the left of the partition 108 shown in FIG. 1 or the area in which the supply of slides 50 can be stacked between the pressure plate 26 and the left side of the first partition 108.

A second section 126 is formed by the space between the partition 108 and 110 which can be referred to as the dummy section. The third section 208 is located to the right of the partition 110 and provides, as shown in FIG. 1, a slide take-up area into which the slides 54 can be stacked after they have been previewed and projected as will hereinafter be described.

A first resilient plate 128, preferably made from a thin piece of steel, is shown in FIGS. 1 and 2. This resilient plate 128 is retained in a fixed position at its inner end against three parts of a wall forming a slotted out wall portion for example 130 formed in the side 18 of the magazine 10 by means of the three inner end portions 132, 134, 136 of the first partition 108.

A second resilient plate 138 is also retained in a fixed position at its inner end against wall portions, for example 140, 142 formed in the side 18 of the magazine 10, by means of the inner end portions 144, 146 of the second partition 110.

The side 18 of the magazine 10 has an embossed portion 148. A spring plate member 150 is retained on the side portion 148 by means of the rivet 152. The ends of the spring plate member 150 is retained in a nonrotatable position on embossed portion 148 by means of the bent portion 154 in the right end that protrudes into the apertured slotted wall portion 156 formed in the embossed portion 148.

The left end of member 150 has a bent portion 158 that extends through the side wall 18 and along the inner surfaces of the resilient plate 128 to apply a spring force to the inside surface of the plate 128 in order to retain plate 128 in snug engagement with the inner surface of the stationary partition 108 as is best shown in FIG. 7 and 11.

The left end of the number 150 has a second bent portion 160 that extends through the side wall 18 and along the inner surface of the second resilient plate 138 to apply a spring force to the outside side surface of the plate 138 in order to retain the plate 138 in snug engagement with the inner surface of the stationary partition 110 as is best shown in FIG. 7 and 11.

The side wall 18 of the tray 10 is slotted at 162 adjacent and on either side of the slotted out wall portion 164, 166 that are formed in the paritions 108, 110 in order to accommodate the passage of a unitary pair of pusher arms 168, 170 therethrough as is shown in FIGS. 2–4.

Details of the pusher arms 168, 170, shown in FIGS. 1-3, the spring bias slide gripping jaw unit 172 shown in FIGS. 5-12, which include a stationary centrally positioned member 174 and gripping jaws 176, 178 associated with the opposite sides of the member 172 as well as the mechanism to move the pusher arms 168, 170 and gripping jaw unit 172 are described in detail in the Blecher et al U. S. Pat. application Ser. No. 759,608.

OPERATION

When the stacked type magazine 10 is mounted against longitudinal movement on one side of the trough as shown in FIG. 4 the base portion 20 of the magazine 10 that is adjacent the other free side of the tray will rest on a raised support portion 180 of the trough 12 of the projector 14 as shown in FIGS. 2 and 3.

A stack of slides 50 are placed in the first or slide supply section 124 between the spring biased pressure plate 26 and the partition 108.

The unitary pusher arms 168, 170 are moved by the previously mentioned slide changing mechanism through an apertured wall 182, formed in the inner wall of the side wall of the trough 14 of the projector, through the apertured wall portions 162, 162 formed in the side wall 18, 64 of the tray 10 and thence into the inner most dashed line position shown for these pusher arms 168, 170 in FIGS. 2 and 3.

As this movement of the pusher arms 168, 170 takes place the first leading slide 184 at the right end of this stack of slides 50 will be moved by the pusher arm 168 from the supply section 124 in tray 10 past the outer ends 186, 187 of resilient plate 128. This resilient plate 128 in turn is biased into physical contact with the first leading slide 184 as shown in FIG. 5 while it moves between the left gripping jaw 176 and the member 174.

The previously referred to slide changing mechanism will then cause the gripping jaw unit 172 to pull the slide 184 toward and into contact with stops 188, 189 where the slide will be in a position to be previewed as shown in FIG. 6.

After previewing slide 184 in the preview position (FIG. 6) the slide changing mechanism moves the slide gripping jaw unit 172 back to its initial FIG. 5 position and in the direction of the arrow shown in FIG. 7. While this takes place the slide 184 will be kicked by a kicker arm of the slide changing mechanism, not shown, in the direction indicated by the arrow 190 as shown in FIG. 7 and thence into the portion 192 of the dummy slot or the second section 126 formed between the partitions 108, 110 and on the right side of the resilient plate 128.

It should be noted that the bent ends 186, 187, spring biased of the resilient member 128, as shown in FIGS. 1 and 2, will prevent the slide 184 from returning to its original position in the supply section 124. A bent resilient slide retaining plate 193 is fixedly connected as shown in FIGS. 1 and 4 to the partition 108 To resiliently retain each slide in the magazine 10 after it is returned to the dummy section in the aforementioned manner.

The pusher arms 168, 170 are again advanced into the slots 164, 166 in the magazine 10 as shown in FIGS. 2 and 3 to simultaneously move the first slide 184 now in the dummy slot 126 along with the second slide 194, that is in the supply stack of slides 50, in the direction of the arrows shown in FIG. 8. As this movement takes place a biasing force will be applied by the ends 186, 187 and 196 of the resilient member 128, 138 to their associated slides 184, 194.

The slides 194, 184 are thus pushed by the pushing arms 168, 170 in the aforementioned manner into gripping relationship between the opposite sides of member 174 and the associated left and right gripping jaws 176, 178 of the slide gripping jaw unit 172 as shown in FIG. 8.

The previously referred to slide changing mechanism will then cause the gripping jaw unit 172 to pull the slides 184, 194 against separate pairs of associated stops 188, 189; 198, 200 into separate positions referred to in the drawing as the show position, or in other words, the projecting position, and a preview position, shown in FIG. 9.

After the aforementioned simultaneous projection and previewing of the slides 194, 184 have taken place the slide changing mechanism will move the slide gripping jaw unit 172 back to its initial FIG. 5 position and in the direction of the arrow shown in FIG. 9. While this takes place the slide 184, 194 will be jointly kicked by a kicker arm of the slide changing mechanism, not shown, in the direction indicated by the arrow 202 as shown in FIG. 10.

FIG. 11 shows how the first kicked slide 184 is then directed by the bent end 196, bevelled edge 204 and embossed portion 206 shown in FIG. 3 into the third or take-up section 208 of the stack type magazine 10.

FIG. 11 also shows that the second kicked slide 194 of the supply stack of slides 50 will be returned to the dummy slot 126 because the leading ends 186, 187 of the resilient plate member 128, as shown in FIGS. 1 and 2, will prevent the slide 194 from returning to its original position in the supply section 124.

After the slides 184, 194 have been moved into their associated take-up and dummy sections 208, 126 of the stack type magazine 10 the pushing arms 168, 170 are again moved into the slotted portions 164, 166 in the partitions 108, 110 to simultaneously push the second slide 194 out of the dummy section 126 into the space between the gripping jaws 178 and the central portion 174 and the third slide 210 in the supply of slides 50 into the space between the jaws 176 and the central portion 174.

Slides 210, 194 are then advanced by the slide moving mechanism to a preview and show position and then returned to associated take-up and dummy sections 208, 126 of the magazine 10 in the same manner as that previously described for the first and second slides 184, 194.

It can be seen from the aforementioned description that this two partition-three section magazine 10 provides a slide storage section 124 for a series of slides 50 from which slides 50 can be sequentially moved into a preview position, a second or dummy section 126 into which slides can be stored after they have been previewed and before they have been moved by a slide changing mechanism to a show or projecting position and into a third or take-up section 208 where the slides are returned from the last mentioned position for storage.

The embodiments of the invention in which an exclusive property or privilege is claimed are defined as follows:

1. A stack type magazine adapted for mounting in a fixed operating position in a preview slide projector, comprising a U-shaped casing, a pair of spaced apart partitions each attached to a first side wall of said U-shaped casing and extending toward and in spaced apart relationship with the other side wall of said casing, a first one of said partitions being positioned to divide the casing into a magazine supply section and a magazine dummy section, a second one of said partitions forming a second wall of said dummy section and separating said last mentioned section from a magazine take-up section, a pressure plate, a resilient means attached to said pressure plate and to said U-shaped casing adapted to press any slides in said magazine in face to face relation with each other between said pressure plate and said first partition, first and second openings one in each of the opposite side walls of said casing, one of said openings extending from said supply section of said casing to said second partition and the second of said openings extending between said supply and take-up sections, the face of the first partition adjacent said supply section and the face of the second partition adjacent said dummy section each having a recess therein that is in alignment with said first opening, said first opening and said last mentioned recesses in said partitions being adapted to receive a pusher arm of the slide ejector of a slide changing mechanism to effect the simultaneous ejection of the slides then adjacent said first partition and said dummy section out through said second opening into separate receiving portions of said slide changing mechanism for transferring said slides respectively to preview and projecting positions in said projector, the receiving portion of said slide changing mechanism including means for returning the previewed and projected slides respectively to said dummy section and said take-up section, a pair of resilient slide guide plates each having one end connected to a separate one of each of said partitions and having at their other ends a bent spring finger which extend over the free end of their associated partitions and into respectively adjacent supply and dummy sections to apply a spring guiding force to the slide in said supply and dummy sections as said slides are ejected from said last mentioned sections and to provide a guide for said slides as the latter are returned by said slide changing mechanism to said dummy and take up sections.

2. The apparatus defined in claim 1 wherein the bent spring fingers of said resilient slide guide plates extend outwardly from their associated partitions through said second opening into positions wherein said spring fingers are adapted to be engaged and flexed by said slides as the latter are moved out of said supply and dummy sections and into said preview and projecting position respectively, said spring fingers further being adapted to guide said slides through said second opening upon their respective return to said take-up and dummy sections.

* * * * *